United States Patent
Goodjohn et al.

(10) Patent No.: US 12,209,345 B2
(45) Date of Patent: Jan. 28, 2025

(54) DOMESTIC APPLIANCES ACTIVITY MONITORING SYSTEMS AND METHODS

(71) Applicant: Haier US Appliance Solutions, Inc., Wilmington, DE (US)

(72) Inventors: Paul Goodjohn, Crestwood, KY (US); Craig Iung-Pei Tsai, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 490 days.

(21) Appl. No.: 17/494,326

(22) Filed: Oct. 5, 2021

(65) Prior Publication Data
US 2023/0103316 A1 Apr. 6, 2023

(51) Int. Cl.
*D06F 34/04* (2020.01)
*D06F 34/28* (2020.01)
(Continued)

(52) U.S. Cl.
CPC .............. *D06F 34/04* (2020.02); *D06F 34/28* (2020.02); *F25D 29/00* (2013.01); *G05B 15/02* (2013.01);
(Continued)

(58) Field of Classification Search
CPC ...... D06F 34/04; D06F 34/28; D06F 2105/54; D06F 2105/58; D06F 34/05;
(Continued)

(56) References Cited

U.S. PATENT DOCUMENTS 7,999,689 B1   8/2011   Ray
8,917,181 B2   12/2014  Edlund
(Continued)

FOREIGN PATENT DOCUMENTS

CN   110136832 A       8/2019
EA      037313 B1 *   3/2021   .............. G01R 31/00
(Continued)

OTHER PUBLICATIONS

A. Ridi, C. Gisler and J. Hennebert, "User interaction event detection in the context of appliance monitoring," 2015 IEEE International Conference on Pervasive Computing and Communication Workshops (PerCom Workshops), St. Louis, MO, USA, 2015, pp. 323-328 (Year: 2015).*

(Continued)

*Primary Examiner* — Douglas Kay
(74) *Attorney, Agent, or Firm* — Dority & Manning, P.A.

(57) ABSTRACT

Systems and methods for detecting activity include a first domestic appliance and a second domestic appliance. Such methods may include detecting a first interaction with one of the first domestic appliance and the second domestic appliance and increasing an activity counter by a first amount based on the first interaction. The methods also include detecting a second interaction with one of the first domestic appliance and the second domestic appliance and increasing the activity counter by a second amount based on the second interaction. The methods further include providing a user notification when the activity counter crosses a predetermined threshold.

16 Claims, 12 Drawing Sheets

(51) Int. Cl.
  *D06F 105/54* (2020.01)
  *D06F 105/58* (2020.01)
  *F25D 29/00* (2006.01)
  *G05B 15/02* (2006.01)

(52) U.S. Cl.
  CPC ...... *D06F 2105/54* (2020.02); *D06F 2105/58* (2020.02)

(58) Field of Classification Search
  CPC ..... D06F 2103/00; F25D 29/00; G05B 15/02; G05B 2219/2642; A47L 15/0063
  See application file for complete search history.

(56) References Cited

U.S. PATENT DOCUMENTS

| | | | |
|---|---|---|---|
| 9,351,640 B2 | 5/2016 | Tran | |
| 11,599,077 B2* | 3/2023 | Schroeder | H04L 12/2818 |
| 2006/0034343 A1* | 2/2006 | Rotem | G06F 1/206 |
| | | | 374/45 |
| 2013/0103222 A1* | 4/2013 | Watson | H02J 3/14 |
| | | | 700/295 |
| 2014/0281650 A1 | 9/2014 | Gilbert | |
| 2016/0258647 A1* | 9/2016 | Imes | H02J 13/00028 |
| 2021/0072097 A1* | 3/2021 | Trundle | F24F 11/62 |
| 2022/0309513 A1* | 9/2022 | Shinar | G06Q 40/08 |
| 2022/0365501 A1* | 11/2022 | Schroeder | H04L 12/2834 |

FOREIGN PATENT DOCUMENTS

| | | | | |
|---|---|---|---|---|
| GB | 2443274 A | * | 4/2008 | ............ G08B 21/04 |
| KR | 20200091235 A | | 7/2020 | |
| WO | WO2017045025 A1 | | 3/2017 | |

OTHER PUBLICATIONS

Wood, Georgina, and Marcus Newborough. "Dynamic energy-consumption indicators for domestic appliances: environment, behaviour and design." Energy and buildings 35, No. 8 (2003): 821-841 (Year: 2003).*

* cited by examiner

DOMESTIC APPLIANCES ACTIVITY MONITORING SYSTEMS AND METHODS

FIELD OF THE INVENTION

The present subject matter relates generally to systems and methods for monitoring activity levels within a residence.

BACKGROUND OF THE INVENTION

Household appliances are utilized generally for a variety of tasks by a variety of users. For example, a household may include such appliances as laundry appliances, e.g., a washer and/or dryer, kitchen appliances, e.g., a refrigerator, a microwave, and/or a coffee maker, along with room air conditioners and other various appliances.

Some household appliances or domestic appliances can also include features for connecting to and communicating wirelessly, such as over a wireless network. Such communication may provide connected features on the domestic appliances, e.g., where the domestic appliance communicates with a personal device, smart home systems, and/or a remote database such as a cloud server.

While some connected appliances are capable of communicating with other appliances and/or personal devices, such appliances typically only provide information about the appliances themselves or contents thereof, such as operational settings, e.g., temperature settings of a refrigerator appliance or air conditioning appliance, age of food items in the refrigerator appliance, cycle status of a dishwashing appliance or laundry appliance, or cooking status of an oven appliance, etc.

Accordingly, there exists a need for connected appliances which provide further benefits and functions, such as detecting or monitoring activity levels within the household or residence in which the household appliances are located.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a method of detecting activity is provided. The method uses a first domestic appliance and a second domestic appliance. The method includes detecting a first interaction with one of the first domestic appliance and the second domestic appliance and increasing an activity counter by a first amount based on the first interaction. The method also includes detecting a second interaction with one of the first domestic appliance and the second domestic appliance and increasing the activity counter by a second amount based on the second interaction. The method further includes providing a user notification when the activity counter is greater than a predetermined threshold.

In accordance with another embodiment of the present disclosure, a method of detecting activity is provided. The method uses a first domestic appliance and a second domestic appliance. The method includes detecting a first interaction with one of the first domestic appliance and the second domestic appliance and increasing an activity counter by a first amount based on the first interaction. The method also includes detecting a second interaction with one of the first domestic appliance and the second domestic appliance and increasing the activity counter by a second amount based on the second interaction. The method further includes providing a user notification when the activity counter is less than a predetermined threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
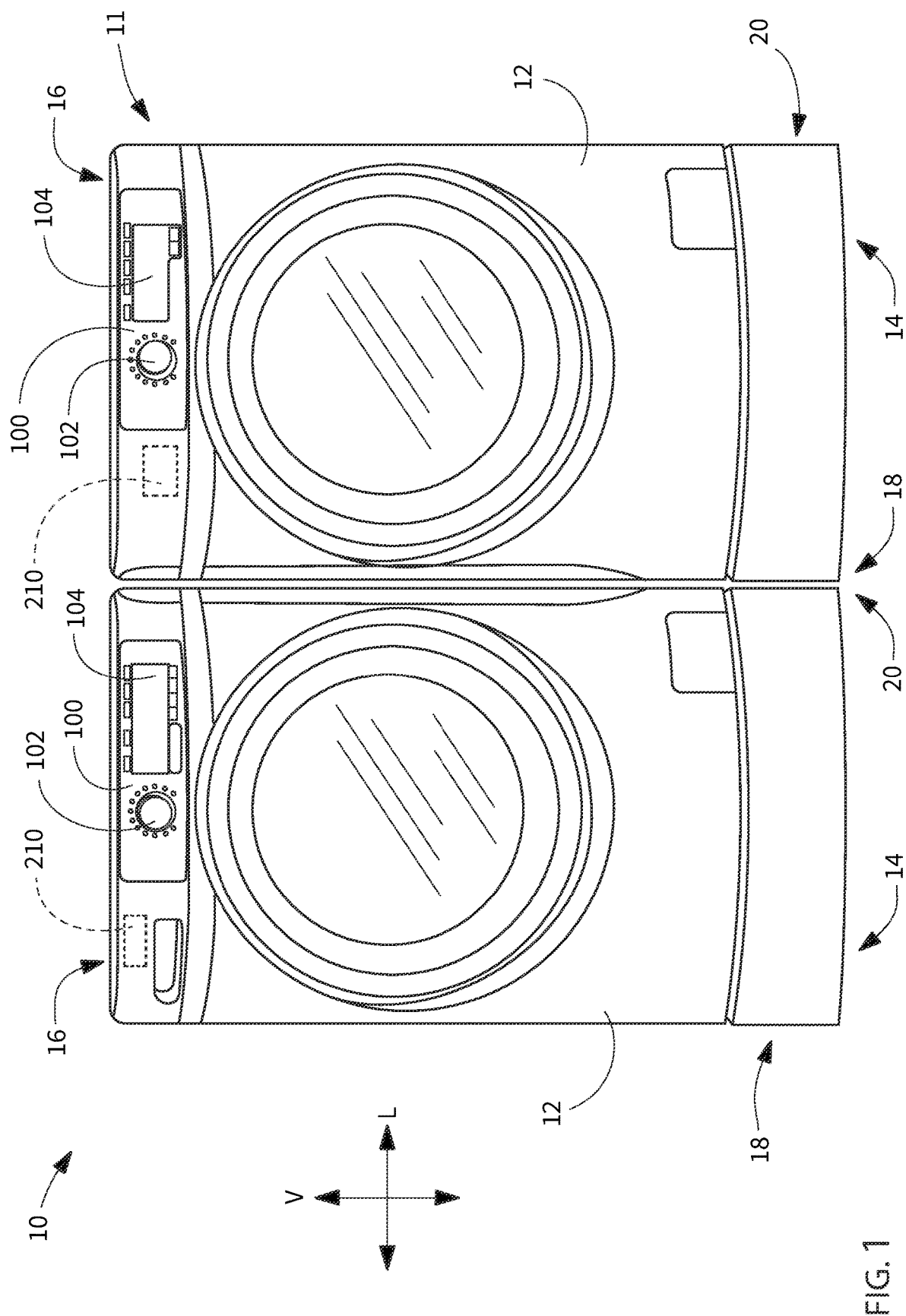
FIG. 1 provides a front view of exemplary laundry appliances in accordance with one or more exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 2:
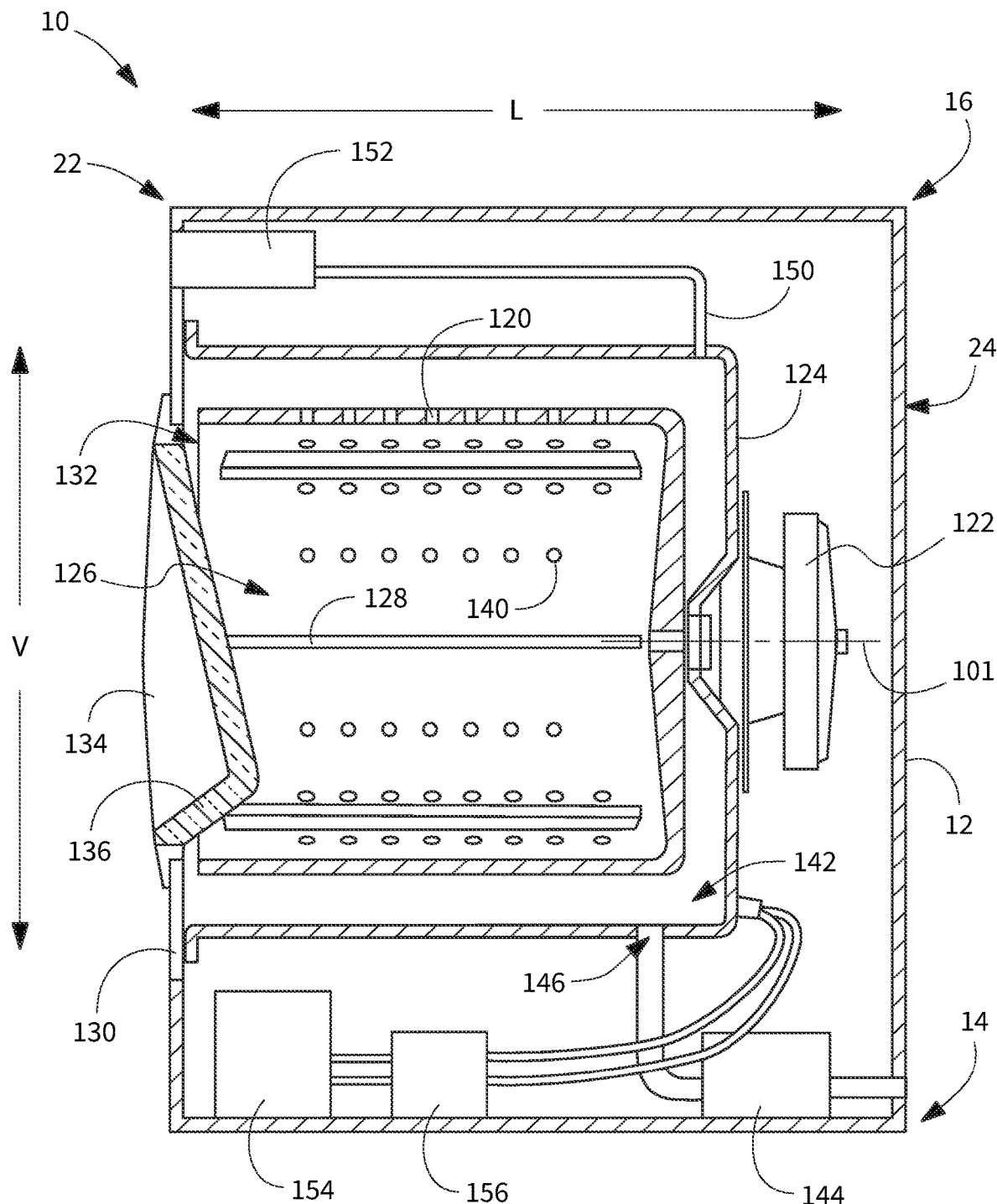
FIG. 2 provides a side cross-sectional view of one of the exemplary laundry appliances of FIG. 1.
Figure 3:
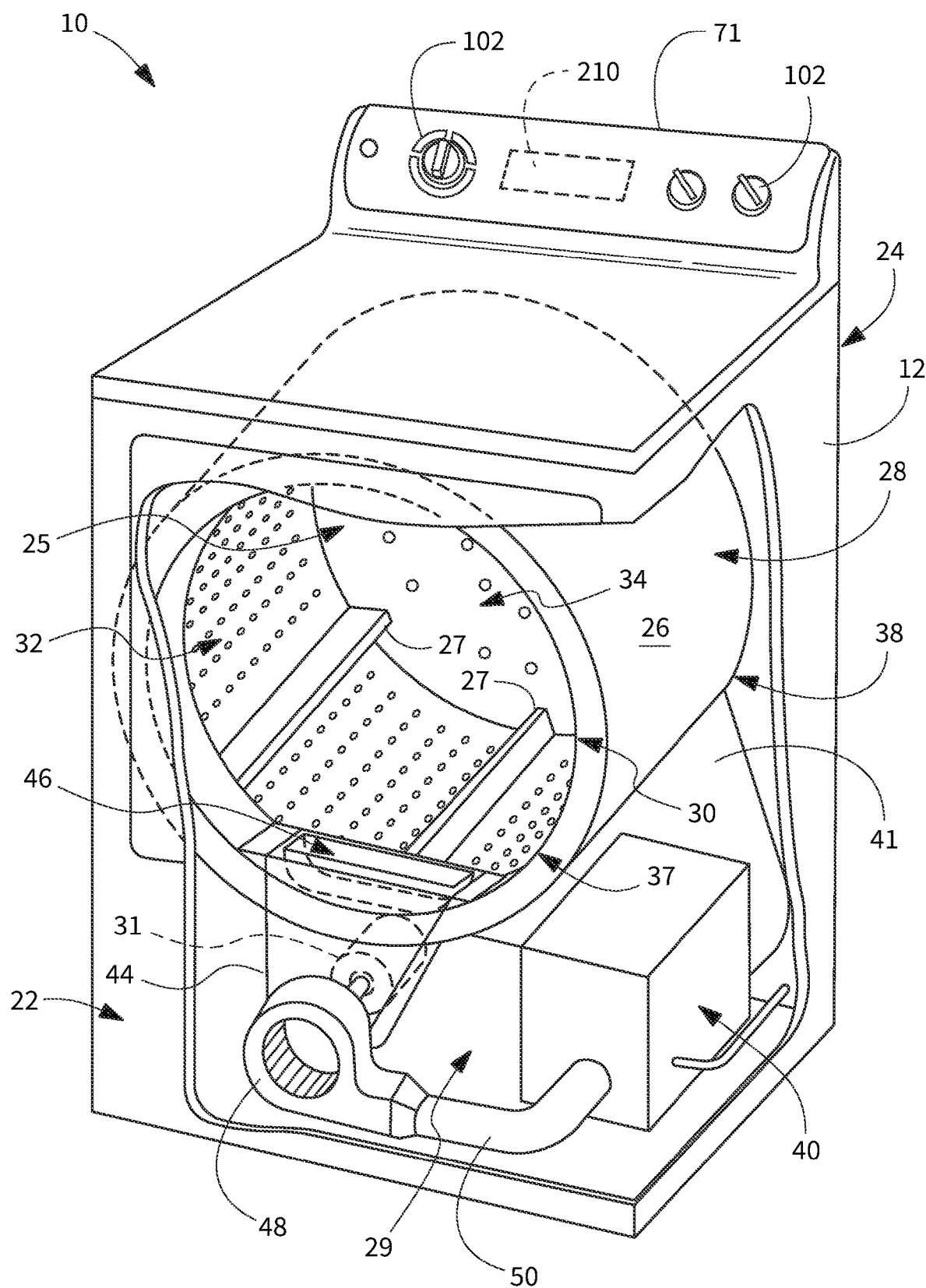
FIG. 3 provides a perspective view of the other exemplary laundry appliance of FIG. 1 with portions of a cabinet of the laundry appliance removed to reveal certain components of the laundry appliance.

As may be seen in FIGS. 1 through 3, in accordance with one or more embodiments of the present subject matter, a group of appliances including at least a first appliance 10 and a second appliance 11 is provided. The illustrated group of two appliances is provided by way of example only. Various embodiments of the present subject matter may also include three or more appliances. For example, FIGS. 4 through 7 illustrate additional appliances 10 which are depicted singly but each of which is to be understood as an exemplary member of a group of appliances. The exemplary appliances of FIGS. 4 through 7 may each be provided in various combinations with one or more of the other appliances of FIGS. 4 through 7 and/or either or both groups of appliances illustrated in FIGS. 1 through 3.

As generally seen throughout FIGS. 1 through 3, 6, and 7, in at least some embodiments, each appliance 10 and 11 includes a cabinet 12 which defines a vertical direction V and a lateral direction L that are mutually perpendicular. Each cabinet 12 extends between a top side 16 and a bottom side 14 along the vertical direction V. Each cabinet 12 also extends between a left side 18 and a right side 20, e.g., along the lateral direction L. In embodiments where one of the appliances 10 and/or 11 is a water heater appliance, such as the water heater appliance illustrated in FIGS. 4 and 5 and described in more detail below, one or more of the appliances of the group may include a cabinet as described herein, whereas the water heater appliance includes a generally cylindrical package.

Each appliance 10 and 11 may include a user interface panel 100 and a user input device 102 which may be positioned on an exterior of the cabinet 12. The user input device 102 is generally positioned proximate to the user interface panel 100, and in some embodiments, the user input device 102 may be positioned on the user interface panel 100.

In various embodiments, the user interface panel 100 may represent a general purpose I/O ("GPIO") device or functional block. In some embodiments, the user interface panel 100 may include or be in operative communication with user input device 102, such as one or more of a variety of digital, analog, electrical, mechanical or electro-mechanical input devices including rotary dials, control knobs, push buttons, and touch pads. The user interface panel 100 may include a display component 104, such as a digital or analog display device designed to provide operational feedback to a user. The display component 104 may also be a touchscreen capable of receiving a user input, such that the display component 104 may also be the user input device 102.

Generally, each appliance 10 and 11 may include a controller 210 in operative communication with the user input device 102. The user interface panel 100 and the user input device 102 may be in communication with the controller 210 via, for example, one or more signal lines or shared communication busses. Input/output ("I/O") signals may be routed between controller 210 and various operational components of the appliances 10 and 11. Operation of the appliances 10 and 11 may each be regulated by the respective controller 210 that is operatively coupled to the corresponding user interface panel 100. A user interface panel 100 may for example provide selections for user manipulation of the operation of an appliance, e.g., via user input device 102 and/or display 104. In response to user manipulation of the user interface panel 100 and/or user input device 102, the controller 210 may operate various components of the appliance 10 or 11. Each controller 210 may include a memory and one or more microprocessors, CPUs or the like, such as general or special purpose microprocessors operable to execute programming instructions or micro-control code associated with operation of the appliance 10 or 11. The memory may represent random access memory such as DRAM, or read only memory such as ROM or FLASH. In one embodiment, the processor executes programming instructions stored in memory. The memory may be a separate component from the processor or may be included onboard within the processor. Alternatively, a controller 210 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 210 may be programmed to operate the respective appliance 10 or 11 by executing instructions stored in memory. For example, the instructions may be software or any set of instructions that when executed by the processing device, cause the processing device to perform operations. Controller 210 can include one or more processor(s) and associated memory device(s) configured to perform a variety of computer-implemented functions and/or instructions (e.g. performing the methods, steps, calculations and the like and storing relevant data as disclosed herein). It should be noted that controllers 210 as disclosed herein are capable of and may be operable to perform any methods and associated method steps as disclosed herein.

In some embodiments, for example, as illustrated in FIG. 1, the group of appliances 10 and 11 may be or include a pair of laundry appliances. In the exemplary embodiment illustrated in FIG. 1, the first appliance may be a washing machine appliance 10 and the second appliance may be a clothes dryer 11. In other embodiments, the washing machine appliance may be the second appliance and the clothes dryer may be the first appliance. In embodiments such as illustrated in FIG. 1, the user input device 102 of each appliance 10 and 11 may be positioned on the user interface panel 100. The embodiment illustrated in FIG. 1 also includes a display 104 on the user interface panel 100 of each appliance 10 and 11.

Additional exemplary details of the laundry appliances 10 and 11 are illustrated in FIGS. 2 and 3. For example, FIG. 2 provides a cross-sectional view of an exemplary washing machine appliance 10 which may, in various embodiments, be one appliance of a group of connected appliances. As illustrated in FIG. 2, a wash tub 124 is non-rotatably mounted within cabinet 12. As may be seen in FIG. 2, the wash tub 124 defines a central axis 101. In the example embodiment illustrated by FIG. 2, the central axis 101 may be oriented generally along or parallel to the transverse direction T of the washing machine appliance 10. Accordingly, the washing machine appliance 10 may be referred to as a horizontal axis washing machine.

Referring again to FIG. 2, a wash basket 120 is rotatably mounted within the tub 124 such that the wash basket 120 is rotatable about an axis of rotation, which generally coincides with central axis 101 of the tub 124. A motor 122, e.g., such as a pancake motor, is in mechanical communication with wash basket 120 to selectively rotate wash basket 120 (e.g., during an agitation or a rinse cycle of washing machine appliance 10). Wash basket 120 defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. The wash basket 120 and the tub 124 may collectively define at least a portion of a tub assembly for the washing machine appliance 10.

Wash basket 120 may define one or more agitator features that extend into wash chamber 126 to assist in agitation and cleaning of articles disposed within wash chamber 126 during operation of washing machine appliance 10. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 12 also includes a front panel 130 which defines an opening 132 that permits user access to wash basket 120 within wash tub 124. More specifically, washing machine appliance 10 includes a door 134 that is positioned in front of opening 132 and is rotatably mounted to front panel 130. Door 134 is rotatable such that door 134 permits selective access to opening 132 by rotating between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 10. Door 134 also includes a handle (not shown) that, e.g., a user may pull when opening and closing door 134. Further, although door 134 is illustrated as mounted to front panel 130, it should be appreciated that door 134 may be mounted to another side of cabinet 12 or any other suitable support according to alternative embodiments.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 10. For example, during operation of washing machine appliance 10, wash fluid may be urged by gravity from basket 120 to sump 142 through plurality of perforations 140. A pump assembly 144 is located beneath tub 124 for gravity assisted flow when draining tub 124, e.g., via a drain 146. Pump assembly 144 may be configured for recirculating wash fluid within wash tub 124.

A spout 150 is configured for directing a flow of fluid into wash tub 124. For example, spout 150 may be in fluid communication with a water supply (not shown) in order to direct fluid (e.g., clean water) into wash tub 124. Spout 150 may also be in fluid communication with the sump 142. For example, pump assembly 144 may direct wash fluid disposed in sump 142 to spout 150 in order to circulate wash fluid in wash tub 124.

As illustrated in FIG. 2, a detergent drawer 152 is slidably mounted within front panel 130. Detergent drawer 152 receives a wash additive (e.g., detergent, fabric softener, bleach, or any other suitable liquid or powder) and directs the fluid additive to wash chamber 124 during operation of washing machine appliance 10. According to the illustrated embodiment, detergent drawer 152 may also be fluidly coupled to spout 150 to facilitate the complete and accurate dispensing of wash additive.

Additionally, a bulk reservoir 154 is disposed within cabinet 12. Bulk reservoir 154 is also configured for receipt of fluid additive for use during operation of washing machine appliance 10. Bulk reservoir 154 is sized such that a volume of fluid additive sufficient for a plurality or multitude of wash cycles of washing machine appliance 10 (e.g., five, ten, twenty, fifty, or any other suitable number of wash cycles) may fill bulk reservoir 154. Thus, for example, a user can fill bulk reservoir 154 with fluid additive and operate washing machine appliance 10 for a plurality of wash cycles without refilling bulk reservoir 154 with fluid additive. A reservoir pump 156 is configured for selective delivery of the fluid additive from bulk reservoir 154 to wash tub 124.

During operation of washing machine appliance 10, laundry items are loaded into wash basket 120 through opening 132, and washing operation is initiated through operator manipulation of input selectors 102. Wash tub 124 is filled with water, detergent, and/or other fluid additives, e.g., via spout 150 and/or detergent drawer 152. One or more valves (not shown) can be controlled by washing machine appliance 10 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle and/or after the rinse cycle in order to wring wash fluid from the articles being washed. During a spin cycle, basket 120 is rotated at relatively high speeds. After articles disposed in wash basket 120 are cleaned and/or washed, the user can remove the articles from wash basket 120, e.g., by opening door 134 and reaching into wash basket 120 through opening 132.

While described in the context of a specific embodiment of horizontal axis washing machine appliance 10, using the teachings disclosed herein it will be understood that horizontal axis washing machine appliance 10 is provided by way of example only. Other washing machine appliances having different configurations, different appearances, and/or different features may also be utilized with the present subject matter as well, e.g., vertical axis washing machine appliances.

FIG. 3 provides a perspective view of the dryer appliance 11 of FIG. 1 with a portion of a cabinet or housing 12 of dryer appliance 11 removed in order to show certain components of dryer appliance 10. Dryer appliance 11 generally defines a vertical direction V, a lateral direction L, and a transverse direction T, each of which is mutually perpendicular, such that an orthogonal coordinate system is defined. While described in the context of a specific embodiment of dryer appliance 11, using the teachings disclosed herein, it will be understood that dryer appliance 11 is provided by way of example only. Other dryer appliances having different appearances and different features may also be utilized with the present subject matter as well.

Cabinet 12 includes a front side 22 and a rear side 24 spaced apart from each other along the transverse direction T. Within cabinet 12, an interior volume 29 is defined. A drum or container 26 is mounted for rotation about a substantially horizontal axis within the interior volume 29. Drum 26 defines a chamber 25 for receipt of articles of clothing for tumbling and/or drying. Drum 26 extends between a front portion 37 and a back portion 38. Drum 26 also includes a back or rear wall 34, e.g., at back portion 38 of drum 26. A supply duct 41 may be mounted to rear wall 34 and receives heated air that has been heated by a heating assembly or system 40.

As used herein, the terms "clothing" or "articles" includes but need not be limited to fabrics, textiles, garments, linens, papers, or other items from which the extraction of moisture is desirable. Furthermore, the term "load" or "laundry load" refers to the combination of clothing that may be washed together in a washing machine or dried together in a dryer appliance 11 (e.g., clothes dryer) and may include a mixture of different or similar articles of clothing of different or similar types and kinds of fabrics, textiles, garments and linens within a particular laundering process.

A motor 31 is provided in some embodiments to rotate drum 26 about the horizontal axis, e.g., via a pulley and a belt (not pictured). Drum 26 is generally cylindrical in shape, having an outer cylindrical wall 28 and a front flange or wall 30 that defines an opening 32 of drum 26, e.g., at front portion 37 of drum 26, for loading and unloading of articles into and out of chamber 25 of drum 26. A plurality of lifters or baffles 27 are provided within chamber 25 of drum 26 to lift articles therein and then allow such articles to tumble back to a bottom of drum 26 as drum 26 rotates. Baffles 27 may be mounted to drum 26 such that baffles 27 rotate with drum 26 during operation of dryer appliance 10.

The rear wall 34 of drum 26 may be rotatably supported within the cabinet 12 by a suitable fixed bearing. Rear wall 34 can be fixed or can be rotatable. Rear wall 34 may include, for instance, a plurality of holes that receive hot air that has been heated by heating system 40. The heating system 40 may include, e.g., a heat pump, an electric heating element, and/or a gas heating element (e.g., gas burner). Moisture laden, heated air is drawn from drum 26 by an air handler, such as blower fan 48, which generates a negative air pressure within drum 26. The moisture laden heated air passes through a duct 44 enclosing screen filter 46, which traps lint particles. As the air passes from blower fan 48, it enters a duct 50 and then is passed into heating system 40. In some embodiments, the dryer appliance 10 may be a conventional dryer appliance, e.g., the heating system 40 may be or include an electric heating element, e.g., a resistive heating element, or a gas-powered heating element, e.g., a gas burner. In other embodiments, the dryer appliance may be a condensation dryer, such as a heat pump dryer. In such embodiments, heating system 40 may be or include a heat pump including a sealed refrigerant circuit. Heated air (with a lower moisture content than was received from drum 26), exits heating system 40 and returns to drum 26 by duct 41. After the clothing articles have been dried, they are removed from the drum 26 via opening 32. A door (FIG. 1) provides for closing or accessing drum 26 through opening 32.

In some embodiments, one or more selector inputs 102, such as knobs, buttons, touchscreen interfaces, etc., may be provided or mounted on a cabinet 12 (e.g., on a backsplash 71) and are in operable communication (e.g., electrically coupled or coupled through a wireless network band) with the processing device or controller 210. Controller 210 may also be provided in operable communication with components of the dryer appliance 11 including motor 31, blower 48, or heating system 40. In turn, signals generated in controller 210 direct operation of motor 31, blower 48, or heating system 40 in response to the position of inputs 102. As used herein, "processing device" or "controller" may refer to one or more microprocessors, microcontroller, ASICS, or semiconductor devices and is not restricted necessarily to a single element. The controller 210 may be programmed to operate dryer appliance 10 by executing instructions stored in memory (e.g., non-transitory media). The controller 56 may include, or be associated with, one or more memory elements such as RAM, ROM, or electrically erasable, programmable read only memory (EEPROM). For example, the instructions may be software or any set of instructions that when executed by the processing device, cause the processing device to perform operations. It should be noted that controllers as disclosed herein are capable of and may be operable to perform any methods and associated method steps as disclosed herein. For example, in some embodiments, methods disclosed herein may be embodied in programming instructions stored in the memory and executed by the controller.

Figure 4:
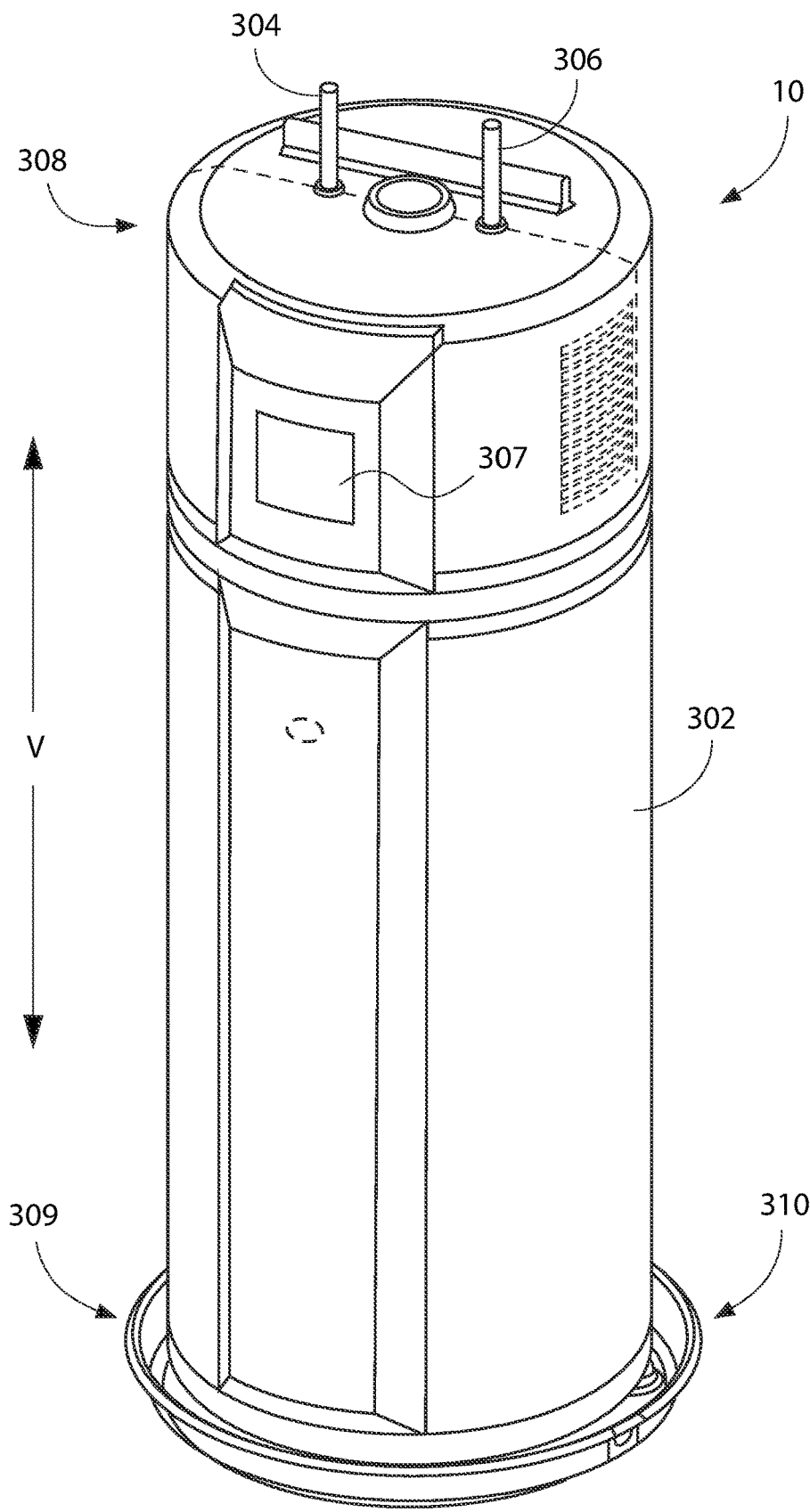
FIG. 4 provides a perspective view of a water heater appliance according to an exemplary embodiment of the present subject matter.
Figure 5:
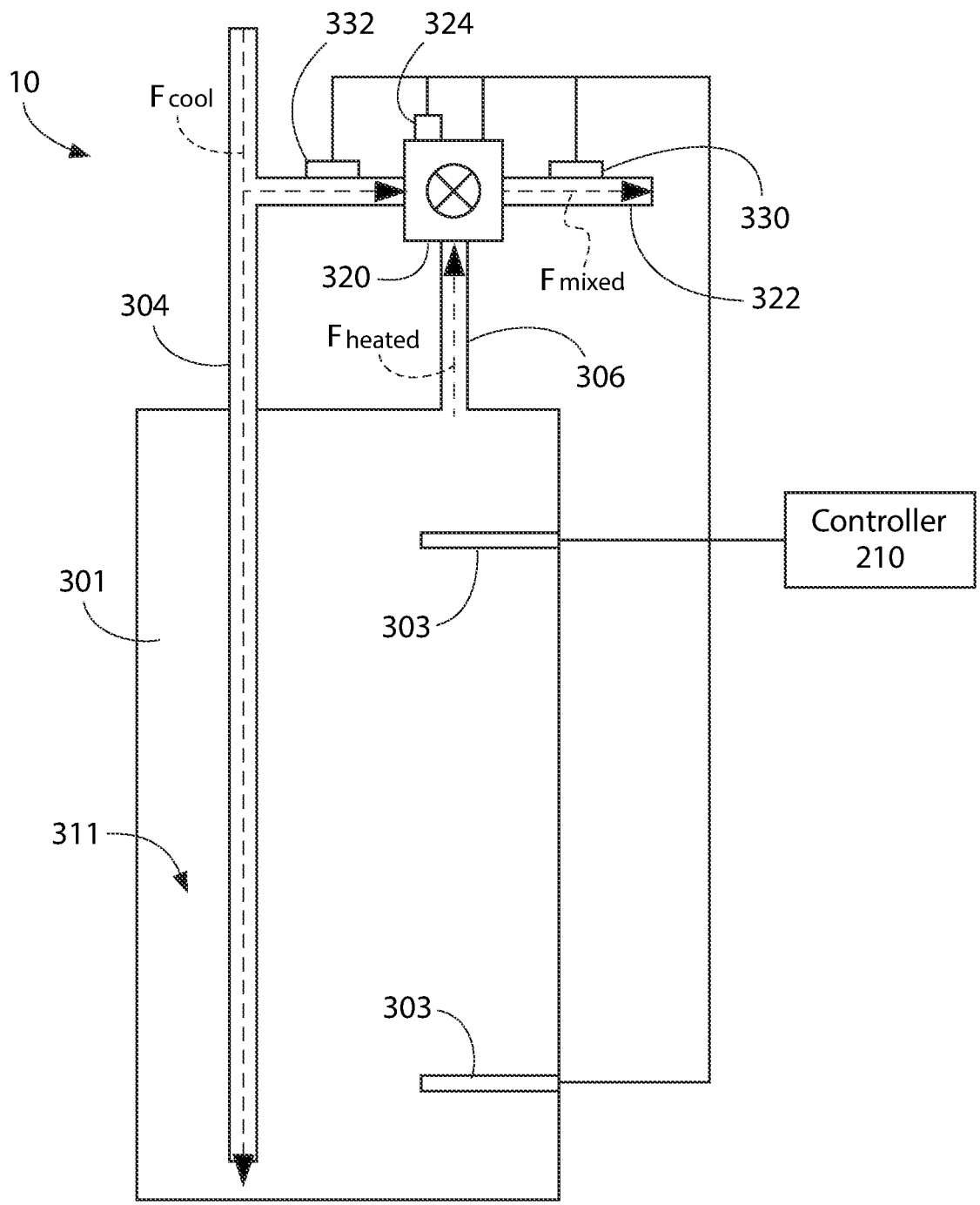
FIG. 5 provides a schematic view of certain components of the exemplary water heater appliance of FIG. 4.

In another example embodiment, the appliance 10 may be a water heater appliance, such as the water heater appliance 10 illustrated in FIGS. 4 and 5. In some exemplary embodiments, the water heater appliance 10 of FIGS. 4 and 5 may be one of a group of appliances, such as a first appliance, second appliance, third appliance, etc., of a group of appliances for an activity monitoring system.

FIG. 4 provides a perspective view of a water heater appliance 10 according to an exemplary embodiment of the present subject matter. Water heater appliance 10 includes a casing 302. A tank 301 (FIG. 5) and heating elements 303 (FIG. 5) are positioned within casing 302 for heating water therein. Heating elements 303 may include a gas burner, a heat pump, an electric resistance element, a microwave element, an induction element, or any other suitable heating element or combination thereof. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

Water heater appliance 10 also includes a cold water conduit 304 and a hot water conduit 306 that are both in fluid communication with a chamber 311 (FIG. 5) defined by tank 301 within tank 301. As an example, cold water from a water source, e.g., a municipal water supply or a well, can enter water heater appliance 10 through cold water conduit 304 (shown schematically with arrow labeled $F_{cool}$ in FIG. 5). From cold water conduit 304, such cold water can enter chamber 311 of tank 301 wherein it is heated with heating elements 303 to generate heated water. Such heated water can exit water heater appliance 10 at hot water conduit 306 and be supplied to an end use point, e.g., such as a bath, shower, sink, or any other suitable feature.

Water heater appliance 10 extends longitudinally between a top portion 308 and a bottom portion 309 along a vertical direction V. Thus, water heater appliance 10 is generally vertically oriented. Water heater appliance 10 can be leveled, e.g., such that casing 302 is plumb in the vertical direction V, in order to facilitate proper operation of water heater appliance 10. It should be understood that water heater appliance 10 is provided by way of example only and that the present subject matter may be used with any suitable water heater appliance.

FIG. 5 provides a schematic view of certain components of water heater appliance 10. As may be seen in FIG. 5, in some example embodiments the water heater appliance 10 may include a mixing valve 320 and a mixed water conduit 322. Mixing valve 320 is in fluid communication with cold water conduit 304, hot water conduit 306, and mixed water conduit 322. The optional mixing valve 320 may be configured for selectively directing water from cold water conduit 304 and hot water conduit 306 into mixed water conduit 322 in order to regulate a temperature of water within mixed water conduit 322.

As an example, mixing valve 320 can selectively adjust a position thereof to permit a variable flow rate of relatively cool water from cold water conduit 304 (shown schematically with arrow labeled $F_{cool}$ in FIG. 5) into mixed water conduit 322 and a variable flow rate of relatively hot water from hot water conduit 306 (shown schematically with arrow labeled $F_{heated}$ in FIG. 5) into mixed water conduit 322, where each flow rate varies with the position of the mixing valve 320. In such a manner, mixing valve 320 can regulate the temperature of water within mixed water conduit 322 and adjust the temperature of water within mixed water conduit 322.

In example embodiments where the optional mixing valve 320 is provided, the water heater appliance 10 may also include a position sensor 324. Position sensor 324 is configured for determining a position of mixing valve 320. Position sensor 324 can monitor and provide feedback regarding the status or position of mixing valve 320 in order to assist with regulating the temperature of water within mixed water conduit 322. Water heater appliance 10 may also includes a mixed water conduit temperature sensor or first temperature sensor 330 and a cold water conduit temperature sensor or second temperature sensor 332 for monitoring the respective water temperatures and providing feedback regarding the system status.

It should be understood that in alternative exemplary embodiments, water heater appliance 10 need not include mixing valve 320 and mixed water conduit 322. In such exemplary embodiments, water may be heated to the end use set-point within the chamber 311 and may flow from within chamber 311 of tank 301 directly into hot water conduit 306 and directly from hot water conduit 306 to the downstream end use point (e.g., without intermixing with any other water flows upstream of the end use point).

Controller 210 can operate heating elements 303 to heat water within chamber 311 of tank 301. As an example, a user can select or establish a set-point temperature for water within chamber 311 of tank 301, or the set-point temperature for water within chamber 311 of tank 301 may be a default value. The set-point temperature or water within chamber 311 of tank 301 may be the desired end use temperature (when the mixing valve 320 is not provided) or may be greater than the desired end-use temperature (in embodiments where the mixing valve 320 is provided). Based upon the set-point temperature for water within chamber 311 of tank 301, controller 210 can selectively activate heating elements 303 in order to heat water within chamber 311 of tank 301 to the set-point temperature for water within chamber 311 of tank 301. The set-point temperature for water within chamber 311 of tank 301 can be any suitable temperature. For example, the set-point temperature for water within chamber 311 of tank 301 may be between about one hundred and forty degrees Fahrenheit and about one hundred and eighty-degrees Fahrenheit.

Controller 210 can also operate mixing valve 320 to regulate the temperature of water within mixed water conduit 322. For example, controller 210 can adjust the position of mixing valve 320 in order to regulate the temperature of water within mixed water conduit 322.

Figure 6:
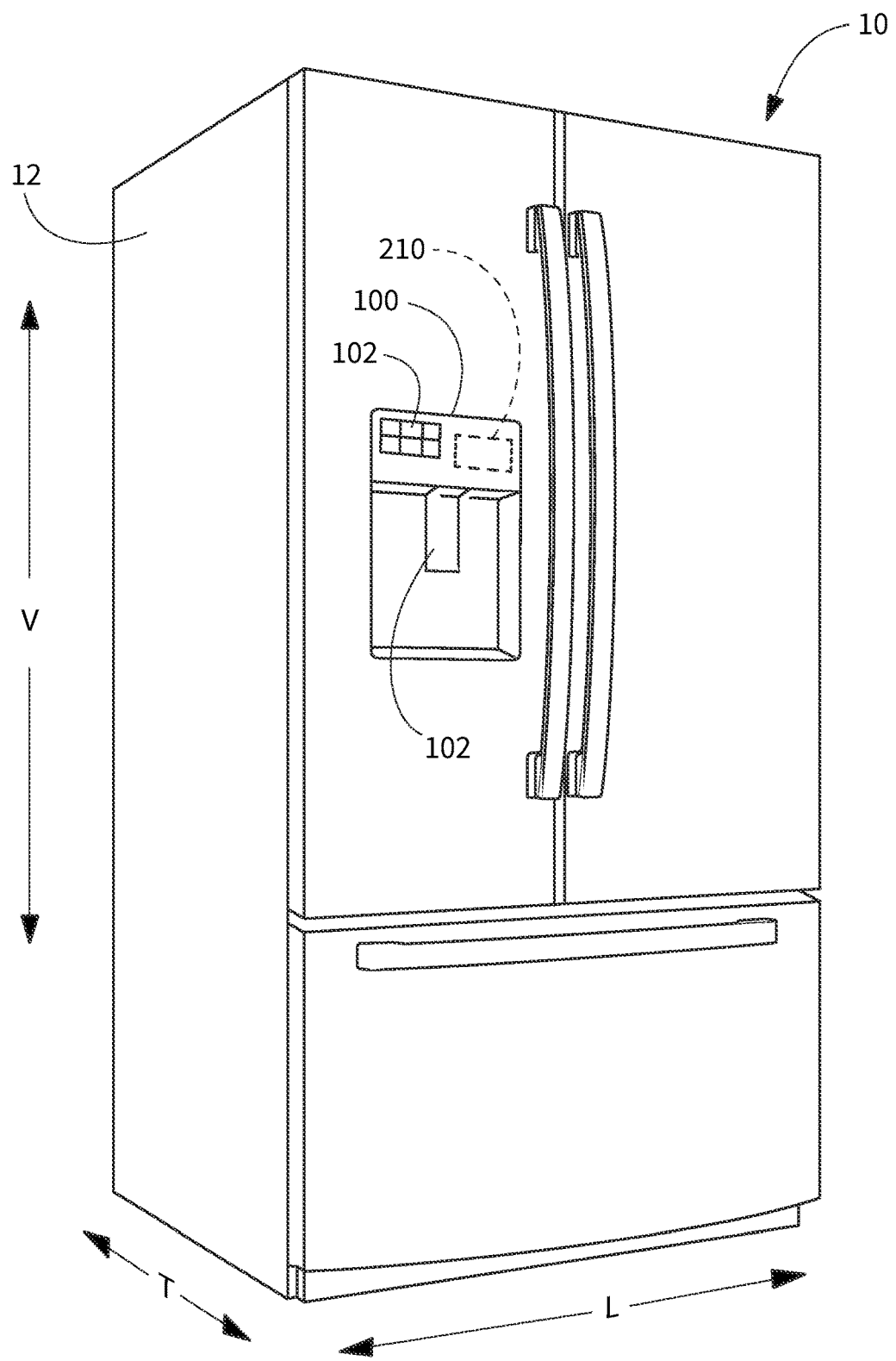
FIG. 6 provides a perspective view of a refrigeration appliance in accordance with one or more additional exemplary embodiments of the present disclosure.

In another example embodiment, the appliance 10 may be a refrigeration appliance, such as is illustrated in FIG. 6. In some exemplary embodiments, the refrigeration appliance 10 of FIG. 6 may be one of a group of appliances, such as a first appliance, second appliance, third appliance, etc., of a group of appliances for an activity monitoring system. Refrigerator appliance 10 is generally referred to as a bottom-mount refrigerator appliance. It should be understood that refrigeration appliance 10 is provided by way of example only. Thus, the present subject matter is not limited to refrigeration appliance 10 and any suitable refrigerator appliance may be utilized in the methods and systems of the present disclosure.

Still referring to FIG. 6, the refrigeration appliance may include a dispenser, e.g., coupled to the user interface panel 100, which may be configured to dispense cold water, hot water, and/or ice. In such embodiments, the user inputs 102 may include, for example, touch inputs (e.g., buttons, touch pad, or touch screen) on the user interface panel 100 and a mechanical actuator or switch for activating the dispenser. As illustrated, dispenser may include a dispenser recess defined on one of the refrigerator doors. The dispenser may include one or more outlets for dispensing ice, chilled liquid water, and/or heated liquid water. Dispenser may, for example, include a paddle 102 (which is an embodiment of a user input for activating the dispenser) mounted below the one or more outlets. As illustrated, the user inputs 102 on the user interface panel 100 may be manipulated, e.g., pressed, to control or select the mode of operation of dispenser, e.g., for selecting chilled liquid water, heated liquid water, crushed ice, and/or whole ice. User interface panel 100 may include a chilled water dispensing button (not labeled), an ice-dispensing button (not labeled) and a heated water dispensing button (not labeled) for selecting between chilled liquid water, ice, and heated liquid water, respectively. The particular structure and operation of the refrigerator and dispensing system are understood by those of skill in the art and, as such, are not described in further detail herein for the sake of brevity.

Figure 7:
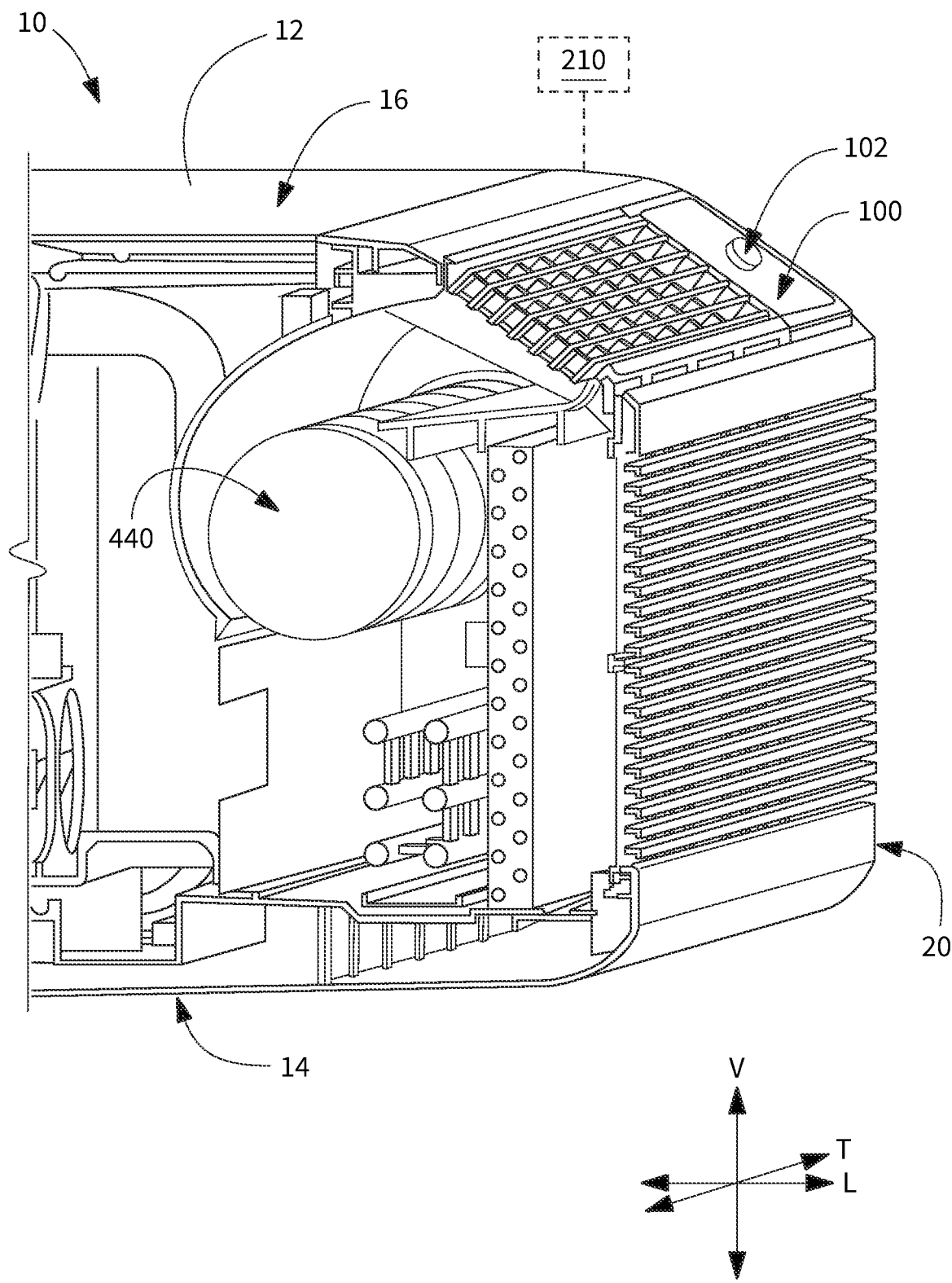
FIG. 7 provides a partial perspective view of an exemplary air conditioner appliance in accordance with additional embodiments of the present disclosure.

FIG. 7 illustrates another example embodiment of an appliance 10, wherein the appliance 10 is a room air conditioner. As illustrated, the exemplary air conditioner 10 includes cabinet 12, user interface panel 100 and user input device 102. In the illustrated example of FIG. 2, the user input device 102 is a control knob. The air conditioner 10 may also include a controller 210, and the controller 210 may be configured to activate the air conditioner 10, e.g., by turning on fan 440 to circulate air.

According to various embodiments of the present disclosure, the group of appliances 10 and 11 may take the form of any of the examples described above in various combinations of any two or more of the exemplary domestic appliances described above, or may be any other domestic appliance. Thus, it will be understood that the present subject matter is not limited to any particular domestic appliance.

It should be understood that "domestic appliances" and/or "appliances" are used herein to describe appliances typically used or intended for common domestic tasks, such as laundry appliances or kitchen appliances, e.g., as illustrated in FIGS. 1 and 2, or air conditioners, dishwashing appliances, refrigerators, water heaters, etc., and any other domestic appliance which performs similar functions in addition to network communication and data processing.

Thus, devices such as a personal computer, router, and other similar devices whose primary functions are network communication and/or data processing are not considered domestic appliances as used herein.

Figure 8:
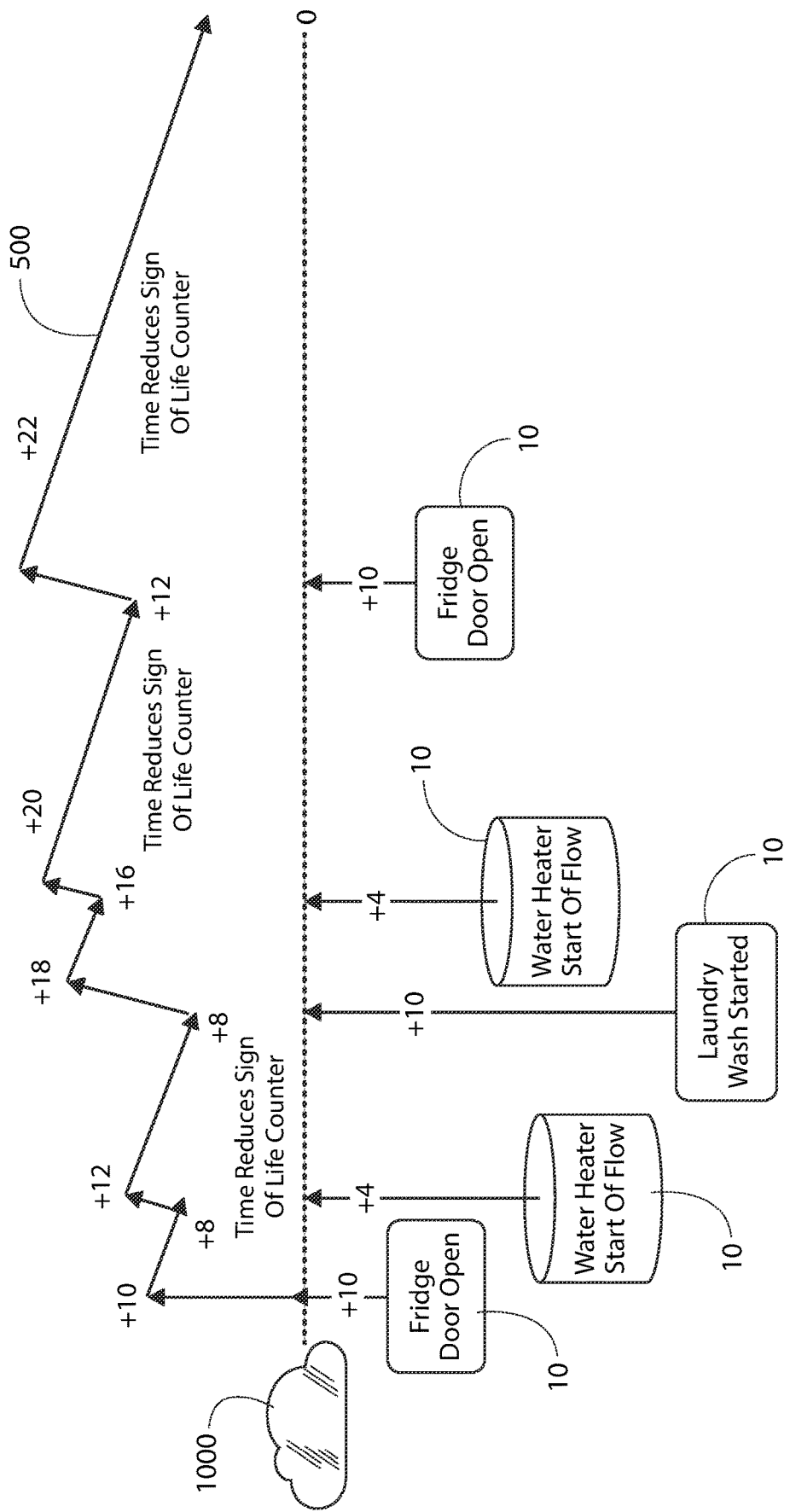
FIG. 8 provides a graph illustrating an activity counter over time in accordance with one or more embodiments of the present disclosure, where the activity counter changes over time in response to various interactions with several domestic appliances.
Figure 9:
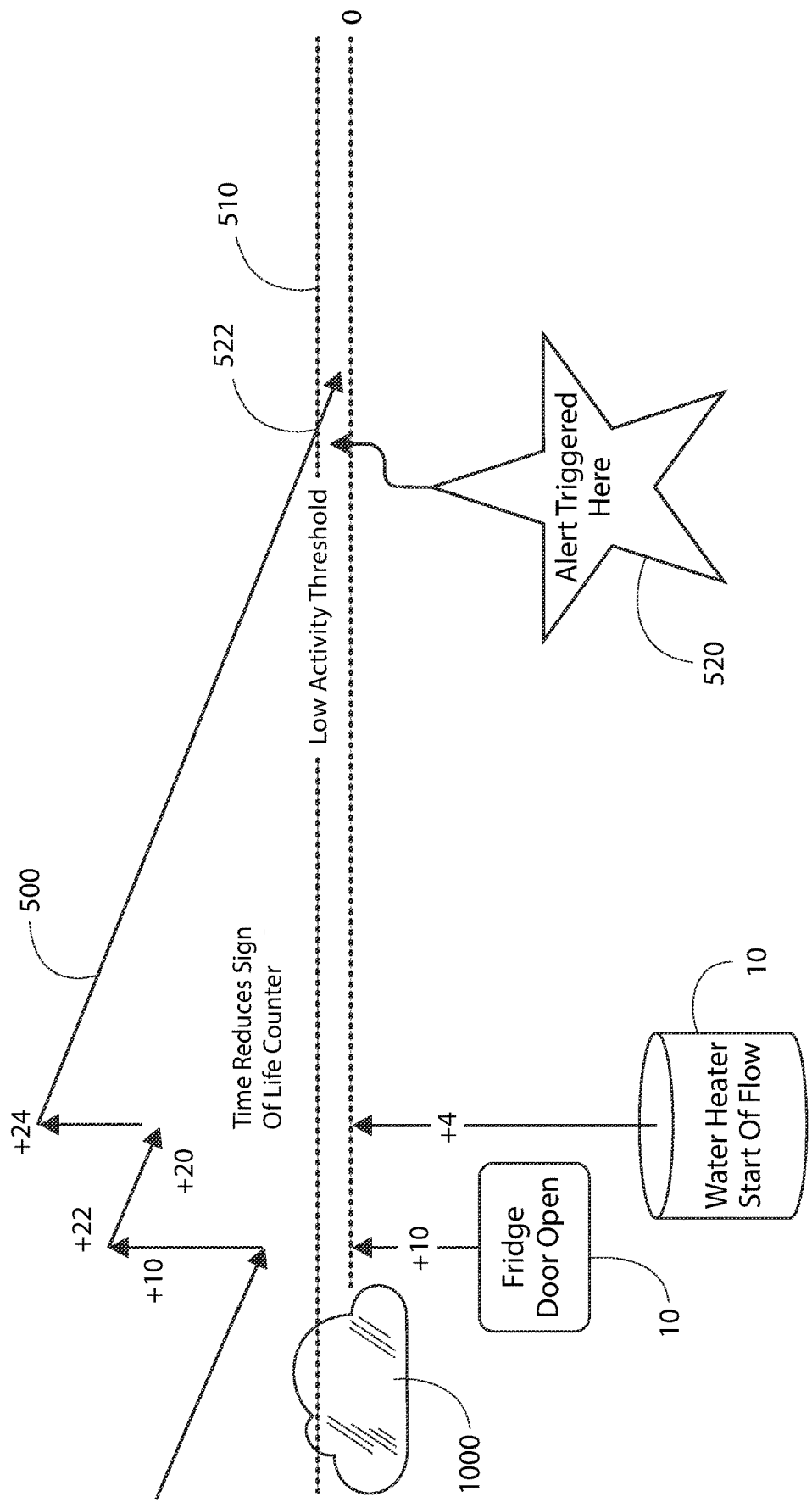
FIG. 9 provides a graph illustrating an activity counter over time including a low activity alert in accordance with one or more embodiments of the present disclosure.
Figure 10:
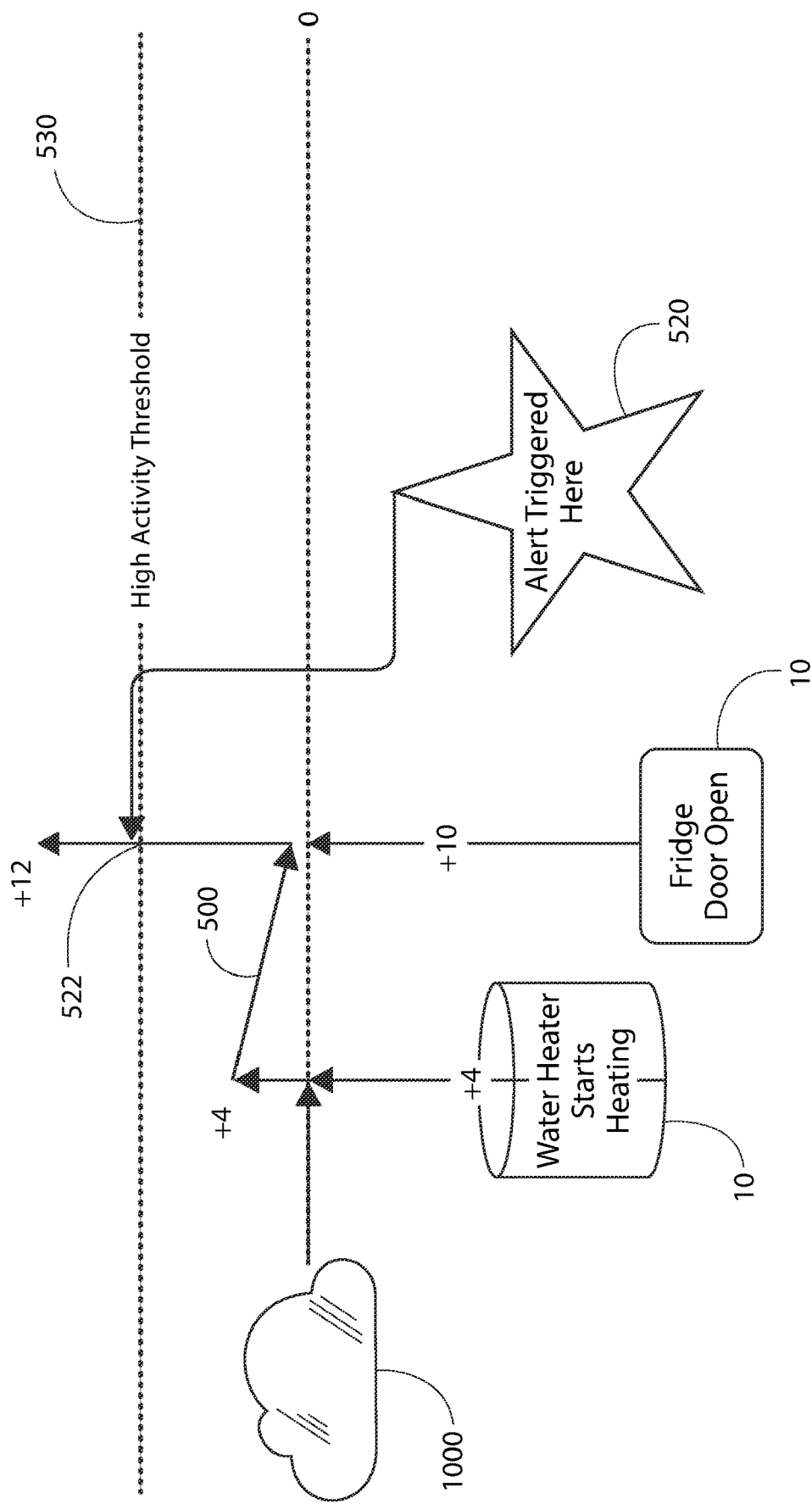
FIG. 10 provides a graph illustrating an activity counter over time including a high activity alert in accordance with one or more embodiments of the present disclosure.

FIG. 8 provides a graph illustrating an activity counter 500 over time in accordance with one or more embodiments of the present disclosure, where the activity counter changes over time in response to various interactions with several domestic appliances 10. Any of the domestic appliances 10 may be referred to as a "first domestic appliance," and any of the remaining domestic appliances 10 may be referred to as a "second," etc., domestic appliance. The activity counter 500 may also be referred to as a Sign of Life counter. As mentioned, the activity counter 500 changes over time in response to interactions with the domestic appliances 10. In some embodiments, the activity counter 500 increases by varying amounts in response to each interaction, where the amount of increase varies based on the type of interaction, e.g., such as a direct interaction (higher amount of increase) or an indirect (or possibly indirect) interaction (lower amount of increase). The activity counter 500 may also, in some embodiments, vary over time when no interactions are detected, e.g., the activity counter may decrease, such as linearly decrease at a constant predetermined rate, e.g., as illustrated in FIGS. 8 through 10, when no interactions are detected.

An interaction with the domestic appliance as used herein includes the domestic appliance receiving an input and responding to that input. For example, the input may be a pulling force exerted on a door handle, and the response may be the door opening, thus, a door opening of the appliance, such as a refrigerator door, may be one of the detected interactions. In additional examples, the input received in the interaction may be a button press, etc. The response to the interaction generally includes at least one change in a physical status or condition of the domestic appliance, such as a door opening, a component of the appliance (e.g. a compressor, fan, and/or motor, etc.) turning off or on, a moving part of the appliance (such as a pump, fan, etc.) increasing or decreasing in speed and/or changing direction, among other possible changes in response to the input.

As illustrated by way of example in FIG. 8, the first (chronologically, in this example) interaction with the first domestic appliance 10 may be an interaction with a refrigerator appliance (such as the exemplary refrigerator appliance 10 illustrated in FIG. 6), such as an opening of a door of the refrigerator appliance. In response to this first interaction, the activity counter 500 is increased by a first amount. The opening of the door may be considered a direct interaction with the appliance 10, e.g., a change in one or more physical states of the appliance that is directly caused by human activity, e.g., via direct physical contact with the appliance. Thus, example direct interactions can include a button pushed (or touchscreen touched, knob turned, or other similar input), a door opened, etc. It should also be noted that the direct interaction is not necessarily caused only by human activity, for example, a domestic animal such as a dog could be trained to open the refrigerator door, or a wild animal such as a raccoon may have entered the household and, for example, opened the refrigerator door (the latter example being a situation the appliance owner would almost certainly want to be made aware of). Thus, a direct interaction may be any change in state of the domestic appliance that is caused by a direct physical interaction with the domestic appliance, where someone (or something) has touched the domestic appliance.

Still referring to FIG. 8, at the leftmost interaction on the page, when the fridge door is opened, the activity counter 500 is increased by a first amount, for example, by ten as illustrated in FIG. 8. The door opening may be detected, e.g., in the cloud 1000, e.g., in a remote database connected to each domestic appliance over the internet, via a change in state, such as fridge door state changes from closed to open, which status is communicated to the cloud database 1000 by the refrigerator appliance 10 and is stored in the cloud 1000 as a status variable. It should also be noted that the activity counter 500 begins at zero in FIG. 8, and does not drop below zero, e.g., if and when the activity counter 500 reaches zero, no further decreases would be applied until after at least one increase in the activity counter 500.

Continuing from left to right on the page in FIG. 8, the activity counter 500 decreases linearly over time after the first interaction (in this example, opening the refrigerator door) is detected, e.g., from ten to eight. The activity counter 500 may decrease at any suitable rate, for example, one point per minute, one point per thirty minutes, etc., where the rate of decrease will generally be proportional to the amount of increase. For example, the first amount of increase may be about ten points, e.g., as illustrated in FIG. 8, or may be about one hundred points, or about four points, or any other value, and the rate of decrease will generally be larger when the amount of increase is larger. For example, in one implementation the first amount of increase may be ten points, and the corresponding rate of decrease may be one point per twenty minutes, whereas in another implementation the first amount of increase may be eighty points, and the corresponding rate of decrease may be one point per five minutes, etc. in various combinations over a wide range of possible amounts of increase and rates of decrease.

Still continuing from left to right on the page in FIG. 8, a second interaction may be detected after the first interaction, such as with a second domestic appliance, e.g., a water heater in the example illustrated in FIG. 8, where the water heater may be, for example, the water heater 10 illustrated in FIGS. 4 and 5. In response to and based on the detected second interaction, the activity counter 500 may be increased by a second amount. In some embodiments, the second amount may be different from, e.g., less than, the first amount of increase. For example, the second interaction may be an indirect interaction, such as a start of flow from the water heater. The indirect interaction may be a change in a state of the domestic appliance that is the result of only implied or indirect human activity. For example, the water heater start of flow may be a direct interaction, e.g., may be caused by a user opening a valve, such as starting a shower, but could also be caused by an automatic process without someone touching the appliance or a control (such as a valve in the water heater example) connected to the appliance. Thus, the water heater start of flow implies human activity but is not direct evidence of a human (or other living thing) interacting with the domestic appliance and the water heater start of flow is therefore an indirect interaction in response to which the activity coulter 500 is increased by a second, lesser, amount, such as four. As noted above, the exemplary amounts of increase are not limiting and any amounts may be used, where the amounts vary based on the interaction that was detected, e.g., a greater increase for a direct interaction and a lesser increase for an indirect (implied) interaction. Other examples of indirect interactions include a setting change, such as a set-point temperature change, e.g., of the water heater, or a chamber temperature for a food storage chamber of the refrigerator appliance, or other similar settings including timers and the like, which may be entered remotely (such as in an app on a smartphone or other similar device remotely, e.g., wirelessly, connected to the domestic appliance) and thus are not necessarily the result of a direct interaction with the domestic appliance, although such setting may also be entered or modified directly on the domestic appliance, whereby such status changes are considered indirect or implied interactions.

By contrast, if a change of state of the domestic appliance is detected where the change of state did not result from any human (or other living thing) interacting with the domestic appliance, the activity counter 500 would not be increased or changed in response to such detected change.

In various embodiments, any number of domestic appliances 10 may be used. For example, when more appliances are connected to the cloud 1000, the activity counter 500 may be more accurate and more responsive by monitoring the statuses of multiple appliances 10. As illustrated, e.g., in FIG. 8, some embodiments may include a third domestic appliance 10, and further embodiments may include a fourth domestic appliance, fifth domestic appliance, and so on. In the example illustrated in FIG. 8, the third domestic appliance may be a laundry appliance, e.g., a washing machine such as the washing machine appliance 10 illustrated in FIGS. 1 and 2. In some embodiments, e.g., as illustrated in FIG. 8, the third interaction with the third domestic appliance may also be a direct interaction, similar to the door opening, and thus the activity counter 500 may again be increased by the first amount in response to detecting another direct interaction, e.g., in at least some embodiments, each direct interaction with any appliance results in the activity counter being increased by the same amount, and each indirect interaction with any appliance results in the activity counter being increased by the same amount, which is less than the amount of increase for a direct interaction and is the same amount for each indirect interaction.

For example, the washing machine appliance may be configured to only start a wash cycle in response to a direct interaction with an input device 102 (see, e.g., FIG. 1) physically connected to the washing machine appliance, such that starting the wash cycle may be a direct interaction, whereas the washing machine appliance may also be configured to provide additional status changes remotely, such as monitoring additive level in a bulk storage tank, and such interactions would be considered indirect interactions in response to which the activity counter 500 would be increased by a lesser amount, e.g., the second amount. Thus, multiple interactions with the same appliance may be detected and the activity counter 500 may be increased in response to each detected interaction by an amount corresponding to (based on) the type of interaction detected, e.g., a first interaction with a first appliance may be a direct interaction and the activity counter 500 increased by a greater amount, followed by a second interaction with the first appliance that may be an indirect interaction and the activity counter 500 increase by a lesser amount in response to the detected indirect interaction.

As further illustrated in FIG. 8, the activity counter 500 may continue to decrease over time after each detected interaction until the next interaction is detected. For example, multiple interactions with the same appliance, including multiple instances of the same interaction with the same appliance, such as multiple openings of the refrigerator appliance door, may be detected and cumulatively tracked by the activity counter 500.

FIG. 9 provides a graph illustrating an activity counter 500 over time including a low activity alert in accordance with one or more embodiments of the present disclosure.

The activity counter 500 illustrated in FIG. 9 operates in a similar manner as described above with respect to FIG. 8. The example activity counter 500 in FIG. 9 includes only two detected interactions with two domestic appliances 10, for the sake of simplicity and clarity of illustration. It should be understood that the activity counter 500 illustrated in FIG. 9 may also include additional domestic appliances 10 and/or additional interactions with one or more of the domestic appliances, e.g., as described above. In some embodiments, e.g., as illustrated in FIG. 9, a low activity threshold 510 may be included. The low activity threshold 510 may be a predetermined value, e.g. may be a value that is programmed into and stored in a memory of the controller 210 and/or in the remote database (cloud 1000). The low activity threshold 510 may be any suitable value, such as greater than zero (as illustrated in FIG. 9, for example) or, as another example, the low activity threshold 510 may be zero.

In embodiments where the low activity threshold 510 is included, when the activity counter 500 crosses the low activity threshold 510, e.g., as illustrated at intersection 522 in FIG. 9, an alert 520 may thereby be triggered. For example, the alert may include providing a user notification when the activity counter 500 is less than the predetermined low activity threshold 510. Such user notifications, e.g. alerts, may be provided on a user interface of one or more of the domestic appliances 10, such as on a display thereof, or an audible alert/notification may be provided by one or more of the domestic appliances 10. The user notification may also or instead be provided remotely, such as on a smartphone app or other computer software running on a remote device, e.g., a tablet, personal computer, or other device. For example, providing the user notification on a remote device, e.g., smartphone, tablet, personal computer, etc., may permit a relative or caregiver to monitor an elderly person living alone, e.g., to make sure the elderly person living alone is active and/or to detect an injury or other circumstance with the elderly person living alone that limits or impairs his or her activity.

FIG. 10 provides a graph illustrating an activity counter 500 over time including an activity alert 520 in accordance with one or more embodiments of the present disclosure. The example activity counter 500 in FIG. 10 includes only two detected interactions with two domestic appliances 10, for the sake of simplicity and clarity of illustration. It should be understood that the activity counter 500 illustrated in FIG. 10 may also include additional domestic appliance 10 and/or additional interactions with one or more of the domestic appliances, e.g., as described above. In some embodiments, e.g., as illustrated in FIG. 10, a high activity threshold 530 may be included. The high activity threshold 530 may be a predetermined value, e.g. may be a value that is programmed into and stored in a memory of the controller 210 and/or in the remote database (cloud 1000). The high activity threshold 530 may be any suitable value that is greater than zero.

In embodiments where the high activity threshold 530 is included, when the activity counter 500 crosses the high activity threshold 530, e.g., as illustrated at intersection 522 in FIG. 10, an alert 520 may thereby be triggered. For example, the alert may include providing a user notification when the activity counter 500 is greater than the predetermined high activity threshold 530. Such user notifications, e.g. alerts, may be provided on a user interface of one or more of the domestic appliances 10 and/or may be provided remotely, as described above regarding the low activity alert in context of FIG. 9. For example, providing the user notification remotely may permit an appliance owner or user to monitor when a child returns home from school or may be used to detect an unauthorized activity within the household, such as when the appliance user is away on vacation, etc.

Figure 11:
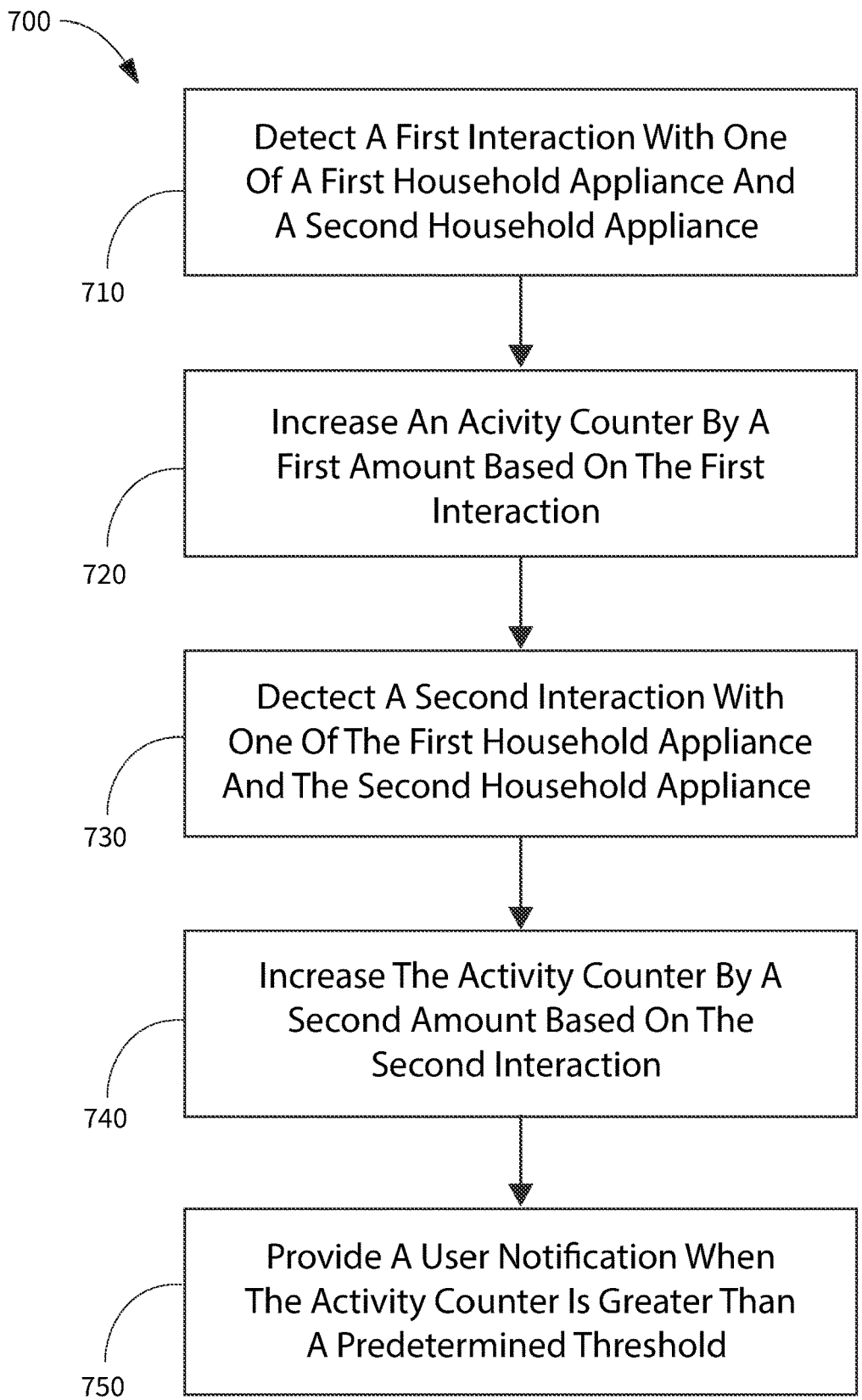
FIG. 11 provides a flowchart illustrating an example method of detecting activity according to one or more example embodiments of the present disclosure.
Figure 12:
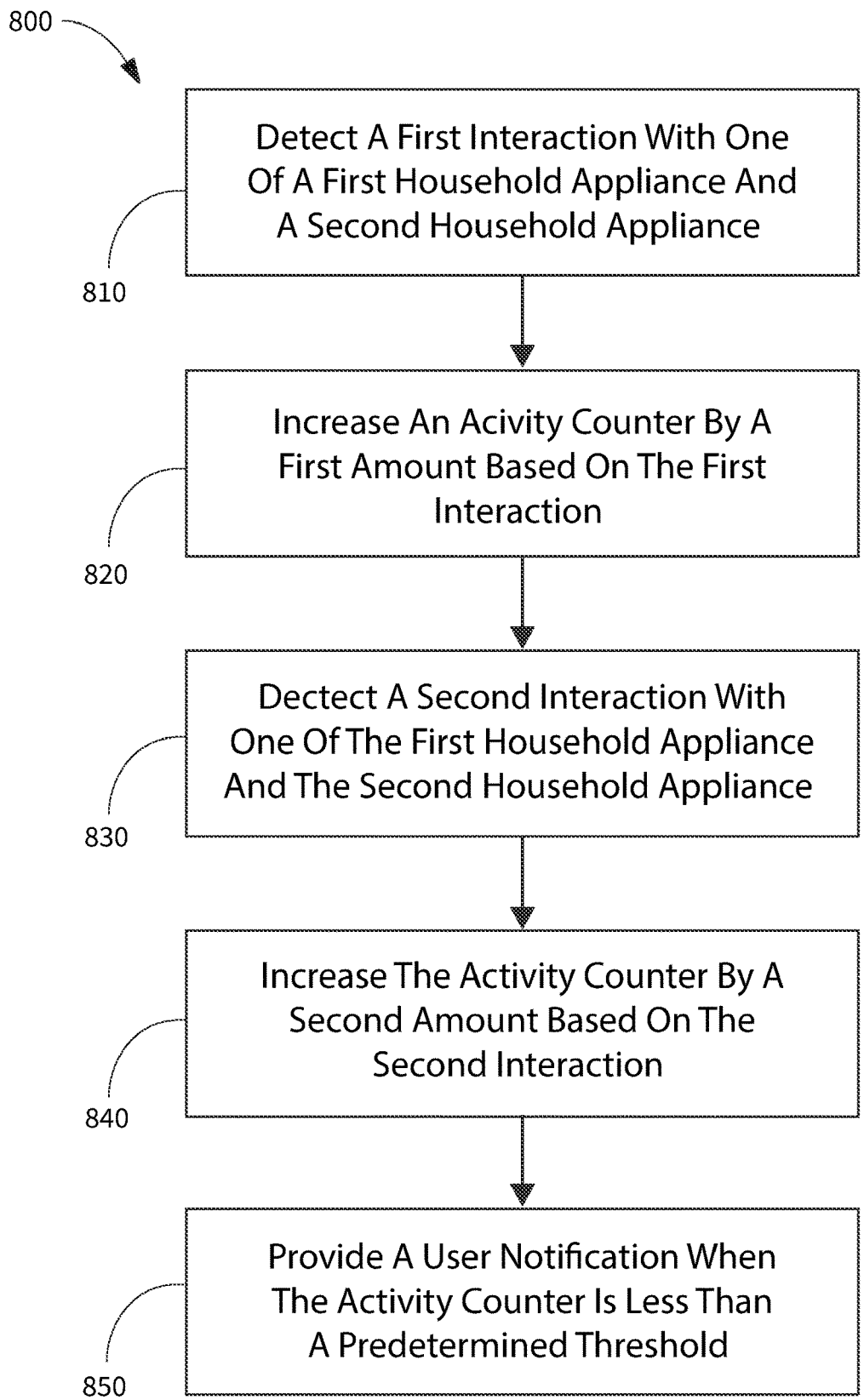
FIG. 12 provides a flowchart illustrating an example method of detecting activity according to one or more additional example embodiments of the present disclosure.

In various embodiments, the present disclosure may also include methods of detecting activity using one or more domestic appliances. Exemplary methods according to the present subject matter include methods of detecting activity, such as the method 700 illustrated in FIG. 11 and the method 800 illustrated in FIG. 12. As illustrated in FIGS. 11 and 12, in some embodiments, an example method 700 or 800 may include a step 710 or 810 of detecting a first interaction with a domestic appliance, e.g., the domestic appliance may be one of a first domestic appliance and a second domestic appliance.

The example method 700 or 800 may also include a step 720 or 820 of increasing an activity counter, such as activity counter 500 illustrated in FIGS. 8, 9, and/or 10, by a first amount based on the first interaction. For example, when the first interaction is a direct interaction, as described above, the first amount may be a larger amount, and when the first interaction is an indirect interaction, also as described above, the first amount may be a smaller amount.

Still referring generally to FIGS. 11 and 12, the example method 700 or 800 may further include a step 730 or 830 of detecting a second interaction with one of the first domestic appliance and the second domestic appliance, where the second detected interaction may be an interaction with the same domestic appliance as the first detected interaction, or may be an interaction with an additional appliance, e.g., the other of the first domestic appliance and the second domestic appliance. Further, the second detected interaction may be a subsequent detection of the same interaction with the same appliance, e.g., the first and second detected interactions may both be refrigerator door openings, wash cycle starts, etc. Also by way of example, the first interaction and the second interaction may be different interactions with the same domestic appliance or different interactions with different appliances.

The example method 700 or 800 may further include a step 740 or 840 of increasing an activity counter, such as activity counter 500 illustrated in FIGS. 8, 9, and/or 10, by a second amount based on the second interaction. For example, when the second interaction is a direct interaction, as described above, the second amount may be a larger amount, and when the second interaction is an indirect interaction, also as described above, the second amount may be a smaller amount. Further, the second amount may be the same as the first amount, such as when the first and second interactions are both direct interactions or are both indirect interactions, or the second amount may be different from the first amount, e.g., when the first and second interactions are different types of interactions, including a direct interaction and an indirect interaction with the same domestic appliance.

Referring now specifically to FIG. 11, in some embodiments the method 700 may further include a high activity alert, e.g., a step 750 of providing a user notification when the activity counter is greater than a predetermined threshold. For example, the activity counter in method 700 may be an activity counter 500 such as those illustrated in FIGS. 8 and 10.

Turning now specifically to FIG. 12, in some embodiments, the method 800 may further include a low activity alert, e.g., a step 850 of providing a user notification when the activity counter is less than a predetermined threshold. For example, the activity counter in method 800 may be an activity counter 500 such as those illustrated in FIGS. 8 and 9.

As mentioned above, the example methods 700 and 800 may be used for detecting a human presence, e.g., an elderly person or child, as described above. In additional embodiments, the example methods 700 and 800 may also be used for scheduling certain cycles or operations of the domestic appliance. For example, the methods 700 and 800 may further include initiating a maintenance cycle of one of the first domestic appliance and the second domestic appliance when the activity counter is less than the predetermined threshold. Thus, the maintenance cycle may be performed (rendering the domestic appliance temporarily unavailable or limited during such maintenance cycle, e.g., regenerating a water softener) when the household is unoccupied or in a low activity state (e.g., everyone is sleeping), thereby providing automatic maintenance without inconveniencing the user.

In some exemplary embodiments, the method 700 and/or 800 may not use or include a dedicated activity monitoring device. For example, the method may provide activity monitoring without requiring a dedicated control panel or central hub for which the only purpose is implementing the activity monitoring. Thus, the method may be performed entirely with pre-existing domestic appliances and, in some embodiments, multipurpose devices such as smartphones for receiving the user notification, e.g., without the need to purchase or install additional components or hardware in order to provide the activity monitoring.

As mentioned above, e.g., regarding the refrigerator door opening as an example detected interaction in FIG. 8, the first and second interactions with the first domestic appliance and/or the second domestic appliance may be detected in the cloud. For example, each domestic appliance, e.g., the first, second, and/or third, etc., domestic appliance, may be connected to the cloud (such as over the internet via a home network such as a home WI-FI network) and may communicate status information, e.g., door opened/closed, temperature settings, cycle start/stop times, etc., to the cloud. Such status information may be stored in the cloud, e.g., as status variable(s) for each connected domestic appliance. Thus, detecting the first and second interactions with the first domestic appliance and/or the second domestic appliance may include receiving status information, by the cloud database, from the first domestic appliance and/or the second domestic appliance, and updating a corresponding status variable for each interaction.

Further, changes to the activity counter, e.g., increasing and/or decreasing the activity counter, may also be performed in the cloud. For example, the remote server and/or remote database may also store the activity counter and thus make the responsive changes to the activity counter in response to the changes in the corresponding status values for each domestic appliance, e.g., in response to each detected interaction, such as where the interaction(s) is or are detected by the cloud based on the status information received from the domestic appliance(s).

Thus, in at least some embodiments, the one or more domestic appliances may not include any additional software or hardware for the activity monitoring. For example, the one or more domestic appliances may only report status information to the cloud, while the detecting steps and changes (increase and/or decrease) to the activity counter may be performed in the cloud.

Systems and methods according to the present disclosure provide numerous advantages, as will be recognized by those of ordinary skill in the art. For example, the present disclosure provides less obtrusive activity monitoring, e.g., as compared to a nanny cam or other activity monitor, thereby advantageously providing increased security and privacy.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of detecting activity using a first domestic appliance and a second domestic appliance, the method comprising:
   receiving, by one of the first domestic appliance and the second domestic appliance, an input, wherein the input comprises physical contact with the one of the first domestic appliance and the second domestic appliance;
   transmitting, by the one of the first domestic appliance and the second domestic appliance, a signal to a remote database connected to each of the first domestic appliance and the second domestic appliance in response to the input;
   detecting, by the remote database, a first interaction with the one of the first domestic appliance and the second domestic appliance based on the signal transmitted by the one of the first domestic appliance and the second domestic appliance, wherein the first interaction is a direct physical interaction by a subject with the one of the first domestic appliance and the second domestic appliance;
   changing, by the one of the first domestic appliance and the second domestic appliance, a physical status of the one of the first domestic appliance and the second domestic appliance in response to the first interaction, wherein changing the physical status comprises a change in one or more physical states of the one of the first domestic appliance and the second domestic appliance directly caused by the input;
   increasing, by the remote database, an activity counter by a first predetermined amount based on the first interaction;
   detecting, by the remote database, a second interaction with one of the first domestic appliance and the second domestic appliance, wherein the second interaction is triggered by the first interaction and is an indirect interaction by a third appliance with the one of the first domestic appliance and the second domestic appliance;
   increasing, by the remote database, the activity counter by a second predetermined amount based on the second interaction;
   decreasing, by the remote database, the activity counter at a predetermined constant linear rate after no interactions are detected within a predetermined time period;
   and providing a user notification when the activity counter is greater than a predetermined threshold.

2. The method of claim 1, further comprising initiating a maintenance cycle of one of the first domestic appliance and the second domestic appliance when the activity counter is less than the predetermined threshold.

3. The method of claim 1, wherein the first amount is greater than the second amount.

4. The method of claim 1, further comprising decreasing the activity counter by a predetermined amount after no interactions are detected within a predetermined time period.

5. The method of claim 1, wherein the method does not use or include a dedicated activity monitoring device.

6. The method of claim 1, wherein the user notification is provided on a user interface of one of the first domestic appliance and the second domestic appliance.

7. The method of claim 1, wherein the user notification is provided on a remote user interface device.

8. The method of claim 1, wherein the first interaction is an interaction with the first domestic appliance and the second interaction is an interaction with the second domestic appliance.

9. A method of detecting activity using a first domestic appliance and a second domestic appliance, the method comprising:
   receiving, by one of the first domestic appliance and the second domestic appliance, an input;
   transmitting, by the one of the first domestic appliance and the second domestic appliance, a signal to a remote database connected to each of the first domestic appliance and the second domestic appliance in response to the input;
   detecting, by the remote database, a first interaction with the one of the first domestic appliance and the second domestic appliance based on the signal transmitted by the one of the first domestic appliance and the second domestic appliance, wherein the first interaction is a direct physical interaction by a subject with the one of the first domestic appliance and the second domestic appliance;
   changing, by the one of the first domestic appliance and the second domestic appliance, a physical status of the one of the first domestic appliance and the second domestic appliance in response to the first interaction wherein changing the physical status comprises causing, by the one of the first domestic appliance and the second domestic appliance, a change in one or more physical states of the one of the first domestic appliance and the second domestic appliance in response to the input;
   increasing, by the remote database, an activity counter by a first amount based on the first interaction;
   detecting, by the remote database, a second interaction with one of the first domestic appliance and the second domestic appliance, wherein the second interaction is triggered by the first interaction and is an indirect interaction by a third appliance with the one of the first domestic appliance and the second domestic appliance;
   increasing, by the remote database, the activity counter by a second amount based on the second interaction;
   decreasing, by the remote database, the activity counter at a predetermined constant linear rate after no interactions are detected within a predetermined time period;
   and providing a user notification when the activity counter is less than a predetermined threshold.

10. The method of claim 9, further comprising initiating a maintenance cycle of one of the first domestic appliance and the second domestic appliance when the activity counter is less than the predetermined threshold.

11. The method of claim 9, wherein the second interaction is an indirect interaction.

12. The method of claim 11, wherein the first amount is greater than the second amount.

13. The method of claim 9, wherein the method does not use or include a dedicated activity monitoring device.

14. The method of claim 9, wherein the user notification is provided on a user interface of one of the first domestic appliance and the second domestic appliance.

15. The method of claim 9, wherein the user notification is provided on a remote user interface device.

16. The method of claim 9, wherein the first interaction is an interaction with the first domestic appliance and the second interaction is an interaction with the second domestic appliance.

\* \* \* \* \*